United States Patent [19]
Neradka

[11] 3,768,308
[45] Oct. 30, 1973

[54] FLOW SENSOR
[75] Inventor: Vincent F. Neradka, Rockville, Md.
[73] Assignee: Bowles Fluidics Corporation, Silver Spring, Md.
[22] Filed: Dec. 3, 1971
[21] Appl. No.: 204,448

[52] U.S. Cl. .................................. 73/189, 73/194 R
[51] Int. Cl. .......................................... G01w 1/02
[58] Field of Search .................. 73/194 R, 188, 189, 73/212

[56] References Cited
UNITED STATES PATENTS
| | | | |
|---|---|---|---|
| 3,343,413 | 9/1967 | South et al. | 73/189 X |
| 3,678,746 | 7/1972 | Corey | 73/194 R |
| 3,686,937 | 8/1972 | Corey | 73/189 |

Primary Examiner—Richard C. Queisser
Assistant Examiner—John P. Beauchamp
Attorney—Howard L. Rose

[57] ABSTRACT

A parallel flow sensor, of the type in which a sensing jet flows parallel to and within a measured flow and experiences velocity variations as a linear function of the measured flow, is modified to vary the sensing jet velocity cosinusoidally in response to angular variations in the measured flow. The flow sensor is located in a flow alignment tube, each end of which has a truncated cone flaring outwardly therefrom in axial alignment with the tube. The truncated cone is spaced from the tube end by angularly spaced supporting ribs which also serve as flow guides along the interior surface of the truncated cone. A short length of cylindrical tubing, having a smaller diameter than the flow alignment tube, is also supported by the ribs and extends from the interior of the flow alignment tube through one end of the truncated cone. Two orthogonally oriented sensors of this type provide respective output pressures which represent the rectangular coordinates of a measured flow such as wind.

11 Claims, 4 Drawing Figures

PATENTED OCT 30 1973
3,768,308

INVENTOR
VINCENT F. NERADKA
BY Howard L. Rose
& Ira C. Edell
ATTORNEYS

FLOW SENSOR

BACKGROUND OF THE INVENTION

The invention described herein may be manufactured and used by or for the Government of the United States of America for governmental purposes without the payment to us of any royalty thereon.

The present invention relates to flow sensing and, more particularly to a flow sensor having no moving parts and which is suitable for use as a two-axis or three-axis wind sensor.

Fluidics technology has produced some uniquely advantageous approaches to measuring flow, primarily because of the fact that fluidic elements require no moving parts. One example of a prior art fluidic flow sensor is found in U.S. Pat. No. 3,343,413 to South et al. The South et al sensor has become known as a cross-flow sensor wherein a fluid jet is issued generally perpendicular to the measured flow and is deflected relative to a receiver by the measured flow. The jet pressure received at the receiver is a function of measured flow velocity. The cross-flow sensor can be utilized as a two-axis wind sensor providing four appropriately spaced receivers for the sensing jet, the sensing jet pressure as received at each receiver providing a measure of a respective rectangular co-ordinate of the wind.

The major disadvantage of the cross flow sensor is its limited range. Specifically, the sensing jet supply pressure and receiver positions can be adjusted to provide effective measurement only over a limited range of measured flow. If the measured flow is too low, jet deflection is not perceived by the receivers; if the measured flow is too high the jet is deflected beyond the reception area of the receivers.

Another disadvantage of the cross-flow sensor is non-linearity of its output pressure versus measured flow characteristic. Specifically, unless the supply pressure is high, the mechanism of the unit's operation is momentum interaction which is characteristically non-linear with velocity.

The aforementioned disadvantages of the cross-flow sensor were substantially eliminated by the development of the parallel-flow sensor. The latter is the subject of U.S. Pat. No. 3,705,534 to Turek. The parallel-flow sensor utilizes a sensing jet issued parallel to and within the measured flow. The velocity of the jet is augmented or diminished by the measured flow, and the resulting jet pressure at the receiver is a linear function of the measured flow over a wide range of flow. When two oppositely directed power jets are issued within the same measured flow, the differential pressure appearing across their receivers is linear over an even greater flow range.

The aforementioned Turek patent describes a two-axis wind sensor employing two orthogonally oriented parallel flow sensors disposed in respective flow-aligning tubes. One of the sensors is utilized to measure wind magnitude; the other measures wind direction. The output pressure of the "direction" sensor is employed as an error signal for a servomotor which rotates the assembly until the direction sensor output pressure is nulled. At this position the direction sensor is perpendicular to the prevalent wind direction and the "magnitude" sensor is parallel to the prevalent wind direction. Wind magnitude can thus be easily recorded as a linear function of the output pressure of the magnitude sensor; wind direction is measured by the angular position of the assembly. The primary disadvantage of this approach to two-axis wind sensing is the necessity for moving parts to position the assembly according to wind direction. These moving parts, in effect, nullify the primary advantage of utilizing fluidics, namely the absence of failure-prone moving parts. Also, extension of this approach to three-axis measurement is difficult.

It is therefore a primary object of the present invention to provide a two-axis wind sensor employing fluidic technology and which does not require moving parts.

A preliminary approach to solving the stated problem would appear to be the utilization of two orthogonally oriented parallel-flow sensors, located in respective flow-aligning tubes as above. Instead of utilizing a wind direction-controlled servo-motor, however, the assembly would be fixed and the output pressures of each sensor would represent a respective rectangular or cartesian component of the measured wind. These pressures could then be converted to the conventionally required polar coordinate system by suitable resolver circuits. The rationale behind this approach resides in the fact that the effective entrance area for the flow-aligning tube varies cosinusoidally with the angular displacement between the tube axis and the wind direction. Consequently the flow through the tube should vary cosinusoidally with wind direction. According to this rationale, therefore, the output pressures from the two orthogonally oriented sensors would be $R\cos\theta$ and $R\sin\theta$, respectively, where R is the magnitude of the wind and $\theta$ is the angle between the axis of the first sensor and the wind direction. These components are easily converted to polar coordinates.

Unfortunately, however, the output pressure of the parallel flow sensor does not follow the wind direction in a cosinusoidal manner. After considerable investigation it was found that flow separation at the ends of the tube was the cause of some erratic output pressures from the sensor, particularly when the wind direction was within ± 20° of being perpendicular to the tube axis.

It is therefore an object of the present invention to modify the parallel flow sensor to achieve a cosinusoidal variation of output pressure with input flow direction.

It is another object of the present invention to provide a two-axis or three-axis flow sensor employing two parallel flow sensors having output pressures which are linear functions of the rectangular or cartesian components of the measured flow.

SUMMARY OF THE INVENTION

According to the principles of the present invention, each end of both orthogonally-oriented flow-aligning tubes includes angularly spaced supporting ribs projecting therefrom. The outer edges of the ribs support a truncated conical member which flares outwardly from the tube and is axially aligned therewith. The ribs are extended along the interior surface of the truncated conical member to serve as flow guides. The inner edges of the ribs support a short cylindrical member of smaller diameter than the flow-aligning tube. The cylindrical member is coaxial with the tube and extends from within the tube to the interior of the conical member. Depending upon the flare angle of the truncated conical member, the spacing between the flow aligning tube ad the conical member, and orientation of the supporting ribs, a reasonably accurate cosinusoidal characteristic of output pressure versus flow direction can be obtained. Two orthogonally oriented flow sensors, thusly modified, provide rectangular co-ordinates of measured wind with sufficient accuracy for all practical purposes.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figure 1:
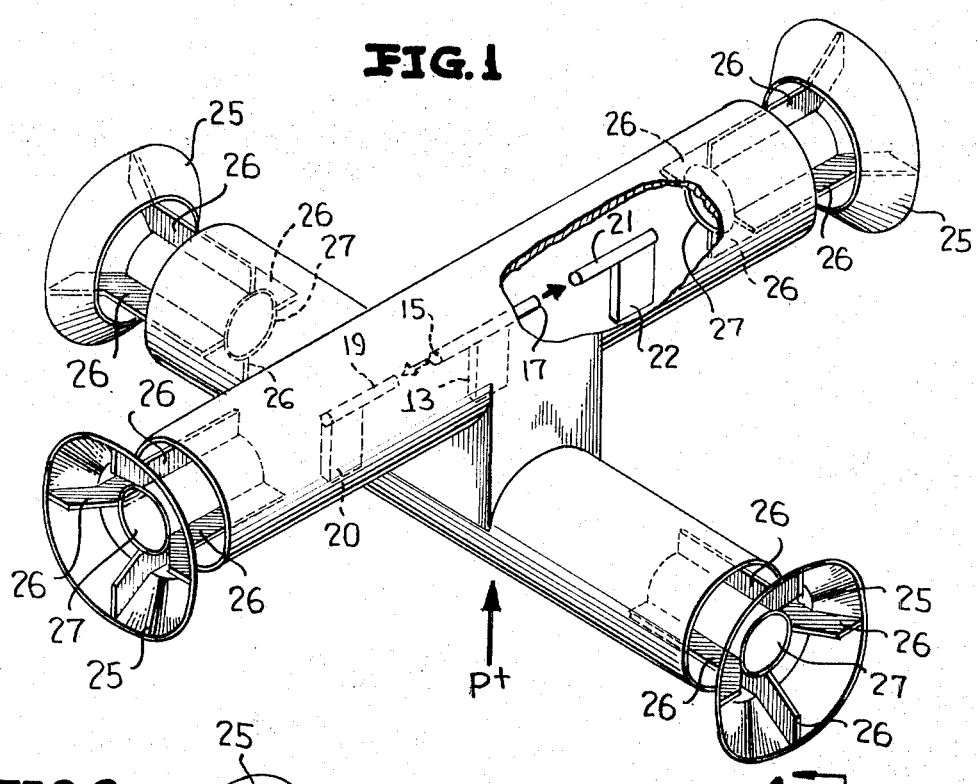
FIG. 1 is a partially cut-away view in perspective of a two-axis wind sensor constructed according to the principles of the present invention.

Referring specifically to FIG. 1 of the accompanying drawings, a pair of flow alignment tubes 10 and 11 are mounted in mutually orthogonal relationship. Specifically, when the unit of FIG. 1 is employed as a wind sensor, tubes 10 and 11 are disposed horizontally, with one tube in north-south alignment and the other in east-west alignment. Inside each tube, although only the interior of tube 10 is illustrated in FIG. 1, there is disposed a parallel flow sensor of the type described in the above referenced Turek patent. The differential pressure version of the parallel flow sensor is illustrated, although the single-ended embodiment may be similarly employed. The parallel flow sensor includes a manifold 13 which receives pressurized fluid, for example pressurized air, and distributes same to two oppositely directed nozzles 15 and 17. Both nozzles 15 and 17 are positioned to issue sensing streams of the pressurized fluid in a direction parallel to the longitudinal axis of flow alignment tube 10. A receiver tube 19 is positioned to receive the sensing stream from nozzle 15 but is located to receive a portion of the sensing stream lying outside the constant velocity core. Wind flowing through tube 10 viscously interacts with the sensing stream to either retard or augment the sensing jet velocity, depending upon which direction the wind flows through the tube. Consequently the pressure in receiver tubes 19, as transmitted to output passage 20, is a measure of the velocity of the wind flowing through tube 10.

A similar receiver 21 is positioned to receive the sensing stream issued by nozzle 17 and transmits a pressure proportional to wind velocity to output passage 22. Assuming equal jet dynamic pressures at receivers 19, 21 with no wind in tube 10, the differential pressure between the receivers varies linearly with wind velocity through the tube. The main advantage of this differential pressure approach resides in the fact that any non-linearities in the individual pressures are balanced and a highly linear output signal versus wind velocity is the result.

Figure 3:
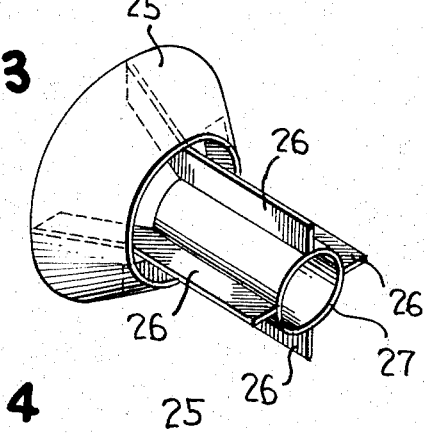
FIG. 3 is a view in perspective of an insert employed at each end of the sensors of FIG. 1.
Figure 2:
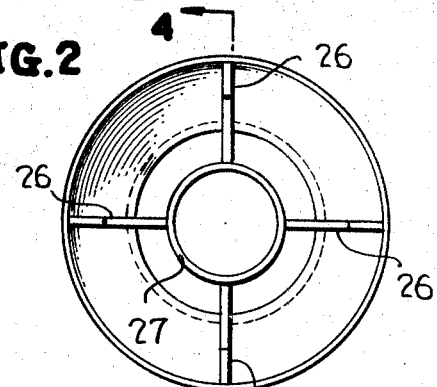
FIG. 2 is an end view of one of the sensors of FIG. 1.
Figure 4:
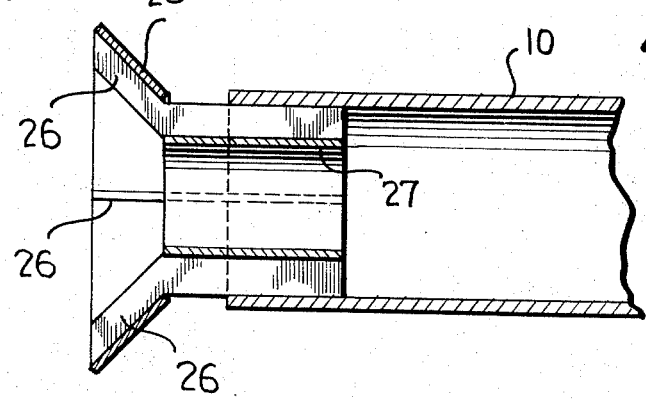
FIG. 4 is a view in section taken along lines 4—4 of FIG. 2.

At each end of both of tubes 10 and 11 there is disposed a truncated cone 25, spaced from the tube end and coaxial with the longitudinal axis of the tube. The truncated cone entrance assembly is best illustrated in FIGS. 2, 3 and 4.

Four supporting ribs 26 are disposed at each end of tubes 10 and 11 and are spaced at 90° intervals. The relatively thin outer edge of each rib 26 is secured to the interior wall of the flow alignment tube. Each rib extends width-wise radially inward toward the longitudinal axis of the flow-alignment tube. Each rib also extends length-wise longitudinally out of the flow alignment tube and then bends at approximately 45° in a radially outward direction. Truncated cone 25 is supported by the radially outward bent portion of ribs 26, with the inner surface of truncated cone 25 secured to the outer edge of ribs 26. Truncated cone 25 flares outwardly away from the flow-alignment tube and is spaced therefrom.

A small cylinder 27 has its longitudinal axis disposed coaxial with the longitudinal axis of the flow alignment tube. The outer wall of cylinder 27 is secured to the radially inward edge of each of the four ribs 26. A portion of cylinder 27 extends out of the flow alignment tube and slightly past the truncated end of truncated cone 25.

The flow separation problem, which drastically distorts the cosinusoidal output pressure versus wind direction characteristic of the sensor when there is no modification of the end of flow tubes 10 and 11, is controlled by the assembly described above in conjunction with truncated cone 25. Wind flow along both surfaces of the truncated cone acts to control the separation problem much in the same manner that slotted flaps on airfoils control separation of flow from the foil surface. Specifically, the slots in a flap act to direct bypass air from the lower surface to the top surface of the foil to move the point of flow separation from the top surface downstream. If the space between truncated cone 25 and the end of tube 10 (or 11) is considered as a slot in an airfoil flap, the same principle applies, whereby bypass air from the outer surface of the truncated cone acts to delay separation of flow from the inner surface of the truncated cone and from the inner surface of the flow alignment tube.

The unit as described provides two differential pressure signals, one from each sensor. These two signals correspond to the rectangular co-ordinate components of the wind or flow being measured. For example, if the direction from left to right along the longitudinal axis of tube 10 is considered a reference direction, the differential pressure measured by the sensor in tube 10 may be expressed as $R\cos\theta$, where $R$ is the actual wind or flow magnitude, and $\theta$ is the angular displacement of wind direction from the reference direction. The differential output pressure at tube 11 is similarly expressed as $R\sin\theta$. To convert these rectangular co-ordinate components into polar co-ordinates (i.e., magnitude and direction), the individual differential pressures may be converted to respective voltages in respective pressure to voltage transducers. The resulting voltages may then be fed to a suitable resolver circuit which converts rectangular co-ordinate components into polar components. Such a resolver, for example, would be the Rectangular to Polar Converter, 695 Series, manufactured by Transmagnetics, Inc. of Farmingdale, New York. Such a resolver receives signals $R\sin\theta$ and $R\cos\theta$ in voltage form and provides output voltages proportional to $R$ and $\theta$.

The basic output pressure wind direction characteristic of the parallel flow sensor as modified according to the present invention is sufficiently close to cosinusoidal for substantially all practical wind measurements. Standard wind direction measurements are usually taken in terms of standard compass point subdivisions which are typically 11.25° or 22.5° apart. The accuracy of the present invention far exceeds the accuracy required for such measurements.

Typical dimensions for the components of the tube entrance assembly are given in the table below by way of example:

Inside diameter of tube 10—1 ¼ in.
Length of truncated cone 25—¾ in.
Inside diameter of truncated cone entrance—2 ¼ in.
Inside diameter of truncated cone exit—1 ¼ in.
Space between truncated cone exit and tube 10—½ in.
Inside diameter of cylinder 27—¾ in.
Angle between tube axis and cone wall—45°

The dimensions listed above can vary, particularly if the size of tubes 10 and 11 are changed. By and large, the correct relative dimensions for different sizes of tubes 10 and 11 are found empirically.

The number of ribs 26 need not be four, but can be more or less. Similarly, the angle of the truncated cone can be varied within the scope of this invention. The important point is to provide a true cosinusoidal wind direction versus output pressure characteristic, and to do this the various components of the present invention can be sized accordingly.

As mentioned above, the principles of the present invention are readily adapted to three-axis flow sensing. Specifically, a third sensor, orthogonally disposed relative to flow tubes 10 and 11, may be utilized to monitor flow in still a third direction.

While I have described and illustrated specific embodiments of my invention, it will be clear that variations of the details of construction which are specifically illustrated and described may be resorted to without departing from the true spirit and scope of the invention as defined in the appended claims.

I claim:

1. In a flow sensor of the type in which measured flow of variable direction is conducted through a flow-alignment tube having at least one entrance, an improvement for rendering the flow through said tube a substantially cosinusoidal function of the direction of the measured flow relative to the longitudinal axis of said tube, said improvement being characterized by:
   a truncated cone having a relatively wide ingress end opening and a relatively small egress end opening; and
   means for supporting said truncated cone proximate to but spaced from said tube entrance, coaxial with said tube, and with the egress end opening of said truncated cone closer to said tube than said ingress end opening.

2. The combination according to claim 1 wherein the diameter of the egress end opening of said truncated cone is approximately equal to diameter of the said tube entrance.

3. The combination according to claim 1 wherein said means for supporting comprises a plurality of rib members secured to and projecting outwardly from the entrance to said tube, said ribs flaring outwardly from said entrance along the interior surface of said truncated cone.

4. In a flow sensor of the type in which measured flow of variable direction is conducted through a flow-alignment tube having at least one entrance, an improvement for rendering the flow through said tube an accurate cosinusoidal function of the direction of the measured flow relative to the longitudinal axis of said tube, said improvement being characterized by:
   a truncated cone having a relatively wide ingress end opening and a relatively small egress end opening; and
   means for supporting said truncated cone proximate to but spaced from said tube entrance, coaxial with said tube, and with the egress end opening of said truncated cone closer to said tube than said ingress end opening;
   wherein said means for supporting comprises a plurality of rib members secured to and projecting outwardly from the entrance to said tube, said ribs flaring outwardly from said entrance along the interior surface of said truncated cone;
   and further comprising a relatively short cylindrical member disposed concentrically within said tube and projecting outward from said tube entrance to at least the open egress end of said truncated cone, the diameter of said cylindrical member being smaller than the diameter of the open egress end of said truncated cone.

5. The combination according to claim 4 wherein the outer wall of said cylindrical member is secured to the radially inner edges of said rib members.

6. In a parallel flow sensor of the type comprising at least one sensing jet flowing within a flow alignment tube, and a receiver located in said tube for receiving said jet at a presssure which varies with the speed of measured flow in said tube, an improvement for rendering the pressure received by said receiver a cosinusoidal function of the direction of said measured flow before entering said tube, the improvement characterized by:
   a plurality of ribs projecting outwardly from one end of said tube and spaced at equal angular locations, said ribs flaring radially outward from beyond said one end of said tube; and
   a truncated conical member, open at both ends and having its interior surface secured to the radially outward edges of said ribs, the radially smaller end of said member being spaced from said tube but closer thereto than the radially larger end of said member.

7. In a parallel flow sensor of the type comprising at least one sensing jet flowing within a flow alignment tube, and a receiver located in said tube for receiving said jet at a pressure which varies with the speed of measured flow in said tube, an improvement for rendering the pressure received by said receiver an accurate cosinusoidal function of the direction of said measured flow before entering said tube, the improvement characterized by:
   a plurality of ribs projecting outwardly from one end of said tube and spaced at equal angular locations, said ribs flaring radially outward from beyond said one end of said tube;
   a truncated conical member open at both ends and having its interior surface secured to the radially outward edges of said ribs, the radially smaller end of said member being spaced from said tube but closer thereto than the radially larger end of said member; and a cylinder of relatively short length and diameter located concentrically within said tube and projecting outwardly from said one end to at least the radially smaller end of said member, the outer wall of said cylinder being secured to the radially inner edges of said ribs.

8. The combination according to claim 7 wherein the diameter of said radially smaller end of said member is no larger than the diameter of said tube and larger than the diameter of said cylinder.

9. The combination according to claim 8 further comprising a second truncated conical member, a second plurality of said ribs, and a second cylinder, all disposed at the opposite end of said tube from said one end and arranged in the same manner as at said one end.

10. The combination according to claim 9 further comprising a second flow alignment tube having an interior parallel flow sensor inside and a truncated conical member, a plurality of ribs, and a cylinder at each end, all arranged in an identical manner to that in the first-recited flow alignment tube, said two flow alignment tubes being oriented with their longitudinal axes mutually perpendicular.

11. The combination according to claim 10 wherein said parallel flow sensors in said flow alignment tubes each comprise means for issuing two oppositely directed sensing jets and means for receiving said jets as a differential pressure proportional to flow through the tube. he tube.

* * * * *